Dec. 13, 1938.     M. ZAVKA     2,140,254
DEVICE FOR OPERATING INTERNAL COMBUSTION ENGINES WITH MIXTURES OF
AMMONIA, HYDROGEN, AND NITROGEN PREPARED FROM AMMONIA
Original Filed Oct. 21, 1936
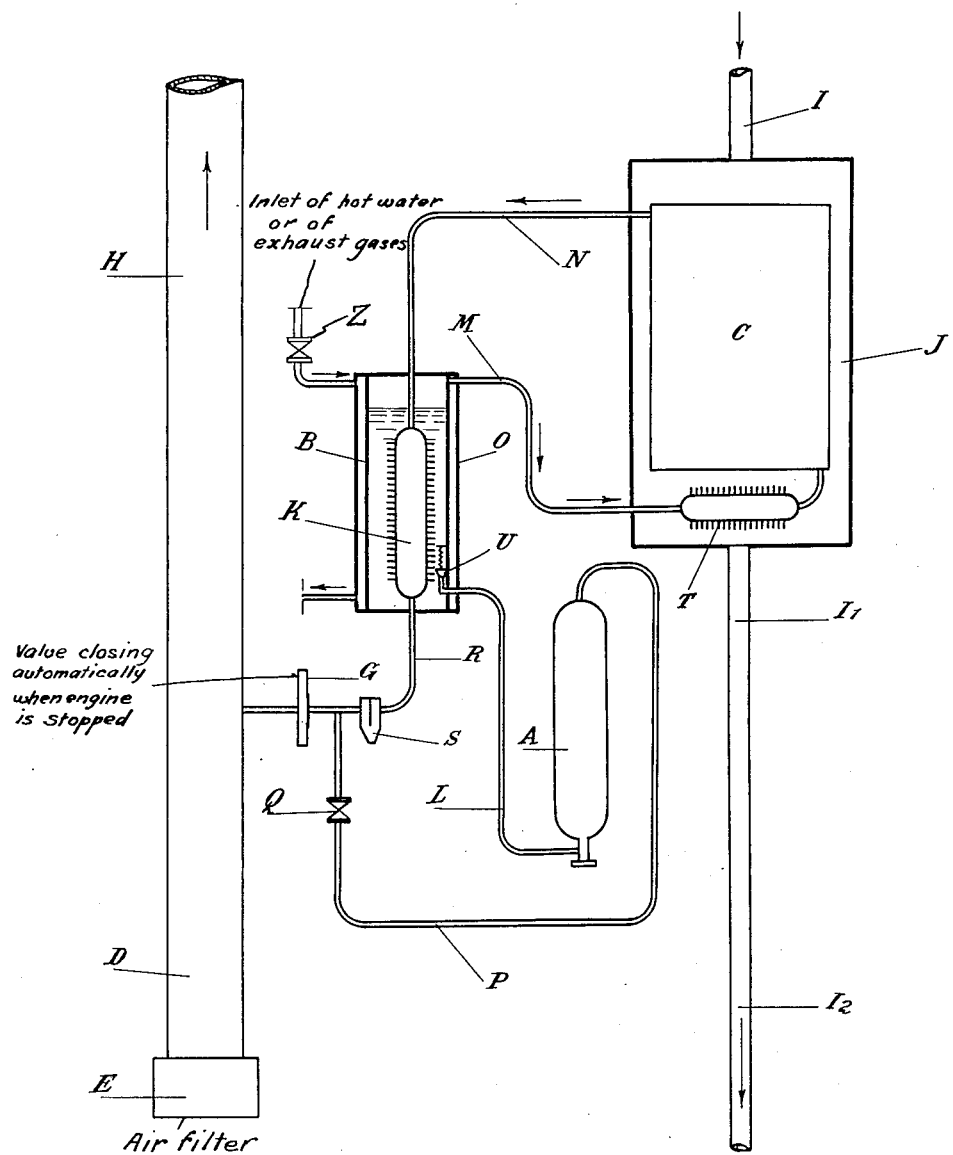
M. Zavka, Inventor
By Glascock Downing & Seebold
Attys.

Patented Dec. 13, 1938

2,140,254

UNITED STATES PATENT OFFICE 2,140,254

DEVICE FOR OPERATING INTERNAL COMBUSTION ENGINES WITH MIXTURES OF AMMONIA, HYDROGEN, AND NITROGEN PREPARED FROM AMMONIA

Mario Zavka, Terni, Italy, assignor to Ammonia Casale Societa Anonima, Lugano Massagno, Switzerland Original application October 21, 1936, Serial No. 106,879. Divided and this application April 29, 1937, Serial No. 139,796. In Italy October 30, 1935

6 Claims. (Cl. 123—119)

The present application is a division of my copending application Serial No. 106,879, filed October 21, 1936, for: "Improvements in and relating to the operation of internal combustion engines, and to the production of and supply of fuel thereto".

In said application it was suggested to operate internal combustion engines employing as fuel mixtures of ammonia and hydrogen (possibly with addition of other combustible or inert gases) the composition of which is such that the ratio between the volume of ammonia and the volume of hydrogen they contain is 3 to 19.

In the above mentioned application it is stated that such mixtures can be prepared using only ammonia, of which a percentage ranging between 3.4 and 18.2 must be decomposed into hydrogen and nitrogen, said decomposition being accomplished by causing the ammonia to pass over substances similar to those which are employed as catalysts in the manufacture of synthetic ammonia.

The present invention relates to devices for the preparation from ammonia of mixtures of ammonia, hydrogen and nitrogen having a composition corresponding to those mentioned above and for using said mixtures as fuel for internal combustion engines. In describing said devices I refer to the schematic drawing herewith appended and which, as an example, represents one of the most simple constructive arrangements which can be given to the devices in question.

In the drawing A is a container provided with a cock and destined to contain liquid ammonia. B is a container in which liquid ammonia is vaporized (ammonia vaporizer), C is a catalysis apparatus, i. e. the apparatus containing the catalyst capable of causing the decomposition of ammonia, D is a tube in which the air for combustion, sucked by the engine, enters through filter E; G is a valve automatically controlled and which closes automatically when the engine is stopped, H is the induction pipe of the engine and I, $I_1$, $I_2$ is the pipe through which the exhaust gases from the engine are discharged outside following the course shown by the arrows in the drawing. This latter tubing has one part J so dimensioned so as to be able to contain the catalysis apparatus C and heat exchanger T and still allow sufficient space for the passage of the exhaust gases. L is a tubing which connects A and B, and of which one end is outside container B and has an automatic valve U, permitting the liquid ammonia to pass from A to B, but preventing its passage from B to A, K is a heat exchanger, M is a tubing connecting apparatus B and T, N is a tubing connecting catalysis apparatus C with heat exchanger K, R is a tubing which connects heat exchanger K with valve G and tube H. Tube R is provided with a water separator S. Tubing P, which is provided with a valve Q connects the upper part of container A with a point along tubing R situated between S and G. Lastly, B is provided with an apparatus whereby it may be heated by means of heat other than the heat given out by exchanger K. In the appended drawing I have for this purpose shown a container O surrounding container B and forming an annular space between B and O through which courses a hot fluid entering at top and issuing at bottom as shown by the arrows in the drawing.

When the apparatus is constructed as shown in the drawing, the heating fluid generally employed is either the exhaust gases (part of which is drawn by connecting the tubing which conveys the heating fluid into C with any point along the tubing I, $I_1$, $I_2$) or hot water drawn from the cooling system of the engine cylinders; in the case of motor traction vehicles said water may be drawn from the pipe which conveys heated water to the radiator and sent back to the radiator. A valve Z permits regulating, and also stopping, the circulation of the heating fluid in question.

In normal running the apparatus operates as follows: Valve Q being closed the liquid ammonia, as a result of pressure in A, causes valve U to open and passes from container A to container B where it vaporizes. The gaseous ammonia thus produced is conveyed through tubing M, to heat exchanger T and thence to apparatus C. In T the gaseous ammonia is heated to a temperature preferably almost equal to the temperature at which apparatus C operates. In C part of the ammonia decomposes into hydrogen and nitrogen. The temperature at which C must be maintained is generally comprised within 320 and 450° C.; but at times however it may attain even 600° C. Exchanger T and apparatus C are both kept at the required temperature by means of exhaust gases circulating around them. The endothermic reaction of decomposition of the ammonia is thus accomplished in apparatus C at the expense of heat contained in the products of combustion part of this heat being thereby recovered.

The mixture of ammonia, hydrogen and nitrogen issuing from C is conveyed through tubing N to heat exchanger K, where it cools, giving the ammonia contained in container B part or all of the heat needed for its vaporization. (Part of this heat can be supplied to the ammonia by apparatus O.) As a result of said cooling it is possible that there may be a condensation of water in tube R. This is apt to occur particularly when the ammonia used is not absolutely anhydrous, or contains dissolved oxygen, and when the catalyst in apparatus C contains small quantities of oxides which are slowly reduced by the hydrogen. Such water is separated and collected by separator S and so does not reach valve G and prevent it, and thus possibly the engine, from operating regularly.

At its exit from S the mixture of ammonia, hydrogen and nitrogen passes through valve G and enters tube H where it expands to atmospheric pressure and mixes with the air for combustion with which it passes to the engine.

The constructive scheme which I have described is generally followed in the case of engines in which the mixture of fuel and air for combustion enters the cylinders at atmospheric pressure.

The same constructive scheme, with a few changes, can also be employed when the mixture of ammonia, hydrogen and nitrogen must be sent to the engine cylinders under a comparatively high pressure, as in the case of engines of the Diesel type. In this case it is obviously useful that the mixture in question should have in tube R a pressure higher than that at which the mixture itself must enter the cylinders, because in this way the necessity for special accessory apparatus to compress the mixture is avoided. To obtain a sufficient pressure for this purpose it will suffice to increase the temperature at which the ammonia is caused to vaporize in B. To this end recourse may be had to the auxiliary heating mentioned above, and which in the case of the apparatus shown in the drawing herewith will be accomplished with the aid of apparatus O.

The pressure in R (and thus also in B, G, T) in the case in point can also be considerably higher than the vapour tension which the ammonia will possess in A. This fact would make it impossible for the ammonia to pass from A into B, but it can be easily remedied by causing the pressure in tubing R to rise from time to time to much higher values than those which generally exist in said tubing. To accomplish this it is sufficient to heat apparatus B to a greater extent so that the quantity of ammonia vaporizing therein, and partially decomposed in C, will be greater than the quantity consumed by the engines within the said time period. Operating in this manner it is easy to cause the pressure in R to increase rapidly. On opening valve Q the same pressure is attained in A, and once valve Q is closed and pressure in R is returned to its normal value, the ammonia will again be able to pass from A into B. All the operations needed to increase the pressure in A can be accomplished while the engine is running without prejudice to its good operation.

The operations just described can furthermore be carried out whenever it is desired to increase the pressure in A.

My invention is not to be considered limited to the constructive scheme which I have herein described as an example. It is obviously possible to give the necessary devices other forms of structure within the limits of the present invention.

Thus during certain experiments apparatus T and C were united to form a single apparatus. Further instead of valve U a level regulator was used, with which it was possible to keep the ammonia in container B at a constant level. Subsequently it was deemed expedient to adopt in its place valve U, which in practice gives better results and costs less than the regulator. By this substitution it results that if for example the quantity of mixture of ammonia, hydrogen and nitrogen consumed by the engine diminishes and the pressure in B consequently increases, valve U stays closed whilst the ammonia in B continues to vaporize. The level of the ammonia in B diminishes, part of exchanger K thus coming into contact with gaseous ammonia instead of with liquid ammonia. The quantity of transmitted heat diminishes and so also the quantity of ammonia vaporized diminishes automatically to the quantity corresponding to the consumption of the engine. The contrary happens when the quantity of mixture consumed by the engine increases. Lastly in certain of my experiments I provided for heating the air for combustion with heat recovered from the exhaust gases. This method may be useful in cases where it is desired to limit the power developed by an engine.

By means of supplementary tubings and valves, it is possible to regulate at will the quantity of hot gases circulating around apparatus T and C and inside K.

The devices constructed according to the present invention although very simple in structure, have given excellent results in practice. In particular, when the engine is stopped, exchanger K and apparatus C stay partly filled with ammonia, hydrogen and nitrogen mixture which is used for starting up the engine. Part of this mixture can also be stored in the upper portion of container A, by opening valve Q after closing the cock with which A is provided. Thus the necessity for having recourse to another fuel, for example gasolene, in order to start the engine and to bring the devices in question to the conditions required for their operation is only likely to occur after repairs which have involved the disassembling of the devices themselves. However, even in such cases the engine can be started by fueling it with a mixture of ammonia and air, and it requires only a very short time to bring the apparatuses to the temperature necessary for the decomposition of ammonia to occur, whereupon the running of the engine becomes normal.

Having now particularly described and ascertained the nature of my said invention and in what manner the same is to be performed, I declare that what I claim is:

1. Devices for fueling internal combustion engines with mixtures of ammonia, hydrogen and nitrogen prepared from liquid ammonia comprising in combination with the exhaust pipe and the induction pipe of the engine, a container for liquid ammonia, an ammonia vaporizer, a tubing connecting the vaporizer with the container for liquid ammonia, a heat exchanger placed inside the exhaust pipe of the engine, another tubing establishing communication between the heat exchanger and the vaporizer, a catalysis apparatus also placed inside the exhaust pipe, a tubing connecting the catalysis apparatus with said heat exchanger, another heat exchanger placed inside the ammonia vaporizer, another tubing connecting the catalysis apparatus with the last mentioned heat exchanger, a further tubing connecting the heat exchanger inside the ammonia vaporizer with the induction pipe of the engine, and a valve on the last mentioned tubing which closes automatically when the engine is stopped.

2. Devices as claimed in claim 1 in which the tubing connecting the ammonia vaporizer with the container of liquid ammonia is provided at its end inside the ammonia vaporizer with an automatically closing valve preventing the passage of liquid ammonia from the vaporizer to the container.

3. Devices as claimed in claim 1 in which the ammonia vaporizer is provided with a heat exchanger through which exhaust gases from the engine are circulated.

4. Devices as claimed in claim 1 in which the ammonia vaporizer is provided with a heat exchanger through which water employed for cooling the engine cylinders is circulated.

5. Device as claimed in claim 1 in which the tubing connecting the heat exchanger placed inside the ammonia vaporizer with the induction pipe of the engine is provided with a water separator placed before the automatically closing valve.

6. Devices as claimed in claim 1 in which the tubing connecting the heat exchanger placed inside the ammonia vaporizer with the induction pipe of the engine is provided with a water separator placed before the automatically closing valve and a valved conduit communicating with the ammonia container a point of said tubing placed between the water separator and the automatically closing valve.

MARIO ZAVKA.